(12) United States Patent
White et al.

(10) Patent No.: US 9,015,148 B2
(45) Date of Patent: Apr. 21, 2015

(54) SUGGESTING RELATED SEARCH QUERIES DURING WEB BROWSING

(75) Inventors: Ryen William White, Woodinville, WA (US); Robert Rounthwaite, Fall City, WA (US); Silviu-Petru Cucerzan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 584 days.

(21) Appl. No.: 12/563,176

(22) Filed: Sep. 21, 2009

(65) Prior Publication Data
US 2011/0072033 A1 Mar. 24, 2011

(51) Int. Cl.
*G06F 17/30* (2006.01)

(52) U.S. Cl.
CPC .................................. *G06F 17/3064* (2013.01)

(58) Field of Classification Search
USPC .......................................... 707/736, 803–804
See application file for complete search history.

(56) References Cited

U.S. PATENT DOCUMENTS

| | | | |
|---|---|---|---|
| 7,360,171 B2 | 4/2008 | Ruthfield et al. | |
| 7,822,744 B2 * | 10/2010 | Isomura | 707/731 |
| 7,844,599 B2 * | 11/2010 | Kasperski et al. | 707/713 |
| 7,849,080 B2 * | 12/2010 | Chang et al. | 707/723 |
| 8,037,527 B2 * | 10/2011 | Milener et al. | 726/22 |
| 8,239,372 B2 * | 8/2012 | Craswell et al. | 707/713 |
| 8,327,440 B2 * | 12/2012 | Milener et al. | 726/22 |
| 8,538,982 B2 * | 9/2013 | Effrat et al. | 707/769 |
| 2001/0037325 A1 * | 11/2001 | Biderman et al. | 707/1 |
| 2002/0016786 A1 * | 2/2002 | Pitkow et al. | 707/3 |
| 2002/0129026 A1 * | 9/2002 | Reardon | 707/10 |
| 2003/0115191 A1 * | 6/2003 | Copperman et al. | 707/3 |
| 2007/0050339 A1 | 3/2007 | Kasperski et al. | |
| 2007/0150466 A1 | 6/2007 | Brave et al. | |
| 2007/0162422 A1 | 7/2007 | Djabarov | |
| 2008/0177717 A1 | 7/2008 | Kumar et al. | |
| 2008/0256061 A1 * | 10/2008 | Chang et al. | 707/5 |
| 2009/0083232 A1 | 3/2009 | Ives | |
| 2009/0144234 A1 | 6/2009 | Sharif et al. | |
| 2009/0276408 A1 * | 11/2009 | Auerbach et al. | 707/3 |
| 2013/0110627 A1 * | 5/2013 | Guha | 705/14.54 |

OTHER PUBLICATIONS

Cucerzan, et al., "Query Suggestion based on User Landing Pages", Retrieved at <<http://research.microsoft.com/en-us/um/people/ryenw/papers/cucerzansigir2007.pdf>>, SIGIR'07, Jul. 23-27, 2007, pp. 2.

Cao, et al., "Context-Aware Query Suggestion by Mining Click-Through and Session Data", Retrieved at << http://research.microsoft.com/en-us/people/hangli/cao_et_al_kdd_2008.pdf>>, KDD'08, Aug. 24-27, 2008, pp. 9.

(Continued)

*Primary Examiner* — Debbie Le

(74) *Attorney, Agent, or Firm* — Dan Choi; Doug Barker; Micky Minhas

(57) ABSTRACT

Described is the presenting of suggested queries for web pages that are not search engine results pages, based upon the URL and/or content of a currently displayed page. The suggested query set may be dynamically extracted (locally or remotely) based upon the content of the web page, and/or obtained from a data store of per-URL suggested query sets, e.g., generated from historical logs. Also described are various techniques for generating suggested queries, and user interface mechanisms that display and allow interaction with suggested queries.

20 Claims, 5 Drawing Sheets

(56) References Cited

OTHER PUBLICATIONS

Strohmaier, et al., "Intentional Query Suggestion: Making User Goals More Explicit During Search", Retrieved at http://www.kmi.tugraz.at/staff/markus/documents/2009_WSCD09_Intentional-Query-Suggestion.pdf>>, WSCD'09 at WSDM'09, Feb. 9, 2009, pp. 7.

Slawski, Bill, "Predictive Search Query Suggestions", Retrieved at <<http://www.seobythesea.com/?p=1375>>, May 8, 2009, pp. 1-11.

* cited by examiner

SUGGESTING RELATED SEARCH QUERIES DURING WEB BROWSING

BACKGROUND

Users of online search systems often benefit from automated assistance in formulating queries. For example, once a user submits a query, existing web search engines typically offer a set of query suggestions (sometimes called "Related Searches") that provide such assistance by helping a user narrow the focus of a search, or explore different aspects of an active search task.

Related searches are based on the query that a user submits, and thus are only offered to users when they are on a search engine result page returned in response to the query. However, most page views are not a direct result of querying a search engine. Instead, most pages are reached by clicking a search result on a search engine result page, browsing via hyperlinks on non-search engine result pages, or through some other means, such as selecting from among saved favorites bookmarks, typing a URL directly into a Web browser address bar, opening a link in email, and so forth.

Search assistance beyond the search engine result page is currently limited to the provision of a search box in web browsers and optional browser toolbars, and the suggestion of possible query completions in a drop-down menu while typing a query. In the Internet Explorer Web browser, "accelerators" let users select text on a web page and search for content based upon that selected text.

While these tools are useful navigational aids, to use these tools, users need to know about and remember their existence and purpose. Moreover, users still need to formulate the initial queries on their own. Formulating a good query remains challenging, especially during exploratory search scenarios.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which one or more suggested queries (of a suggested query set) are displayed in conjunction with a web page that is not a search engine results page. The suggested query set may be extracted (e.g., dynamically) based upon content of the web page, and/or obtained from a data store of per-URL query sets that are generated from a historical log, such as search-related logs, toolbar logs and the like. If extracted from the content, the extraction may occur locally (e.g., in client-side code), or remotely with the results sent back to the client.

In one implementation, a user interface has one part (e.g., a conventional browser) that displays a web page, and another, interactive part (e.g., a browse add-in) that is capable of displaying suggested queries. The interactive part may include a toolbar button that when interacted with, provides a drop down menu that displays suggested queries for selection by further interaction.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards proactively providing suggested queries to a user based upon a currently rendered web page. With such suggested queries, a user can search and browse more effectively based upon browsing activity, without necessarily having to formulate and submit the user's own query.

It should be understood that any of the examples herein are non-limiting. Indeed, as one example, certain user interface elements are shown as facilitating the use of suggested queries, however any practical means of viewing and/or selecting a suggested query may be alternatively or additionally employed. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and search technology in general.

Figure 1:
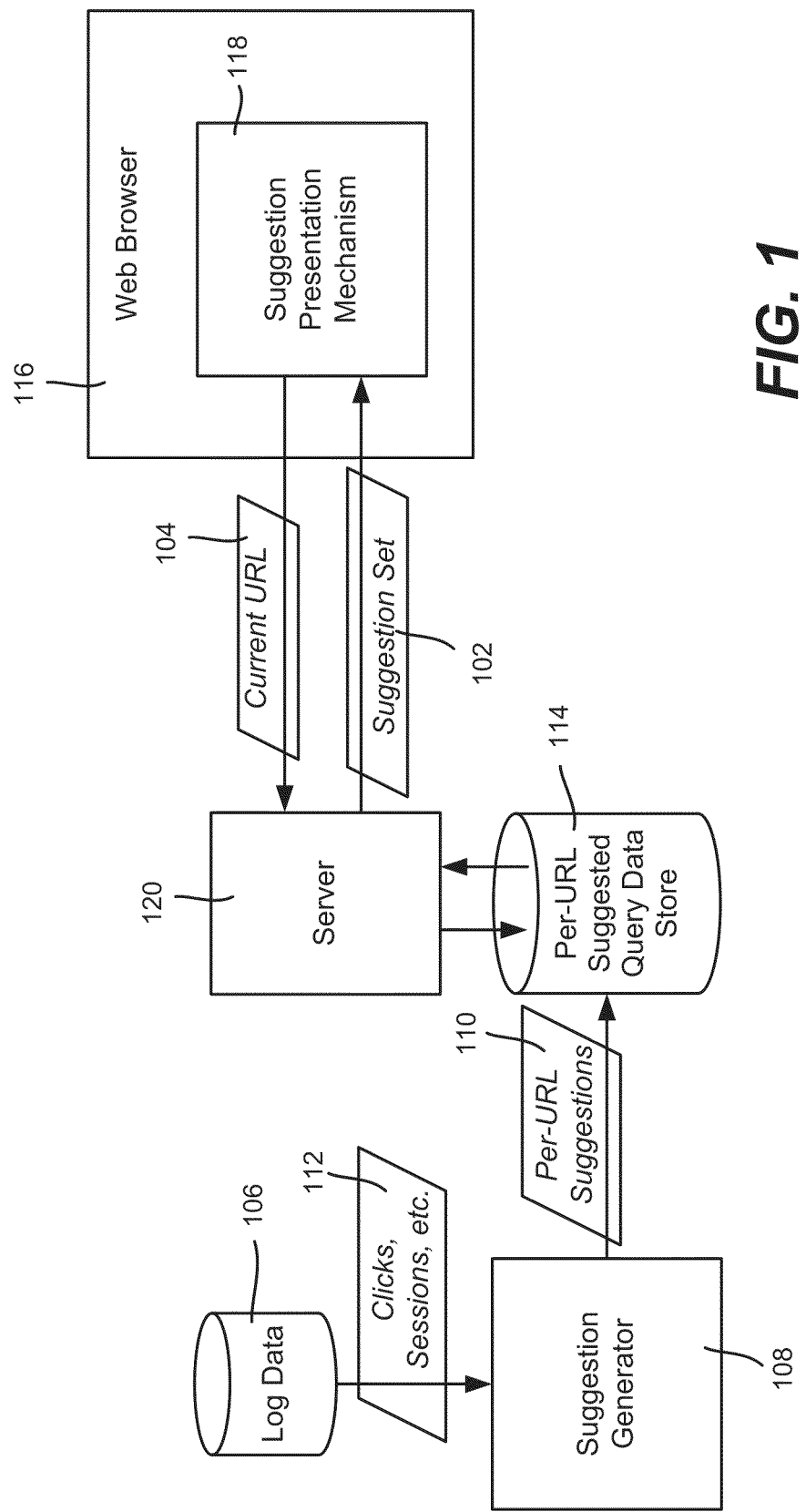
FIG. 1 is a block diagram representing an example implementation for providing suggested queries from a server to a client-side web browser.

Turning to FIG. 1, there is shown one example implementation for obtaining a suggestion set 102 (containing one or more suggested queries) based on a URL 104 currently being requested or viewed. In general, log data 106 from one or more search-related logs such as a query-click log and/or a toolbar log may be mined by a suggestion generator 108 to determine which suggested queries are relevant for which URLs, that is, to provide per-URL suggestions 110. Various ways of generating suggested queries from users' click data/session data 112 (and possibly other data/metadata) are described below.

In this implementation, each URL with a suggested query set (at least one suggested query) has data corresponding to that URL and suggested query set maintained in a data store 114. When a user with a suggested queries-enabled browser 116 including a suggestion presentation mechanism 118 visits a web page, the URL 104 of that page is passed to a remote server 120 and checked against the data store 114 of per-URL suggestions. If a suggestion set of one or more suggested queries is available for the current URL, the suggestion set 102 is returned to the client and offered to the user for selection. If no suggestions are available for the current page, alternative techniques such as URL back-off or alternative sources of suggestions may be tried.

As described below, the use of search logs and other log data may be inappropriate for web pages that are not indexed by search engines, may have low visit counts, and/or change frequently (e.g., blogs or news homepages). In such situations, query suggestions may be dynamically generated in real time based upon current page content, as described below with reference to FIGS. 2 and 3.

Figure 2:
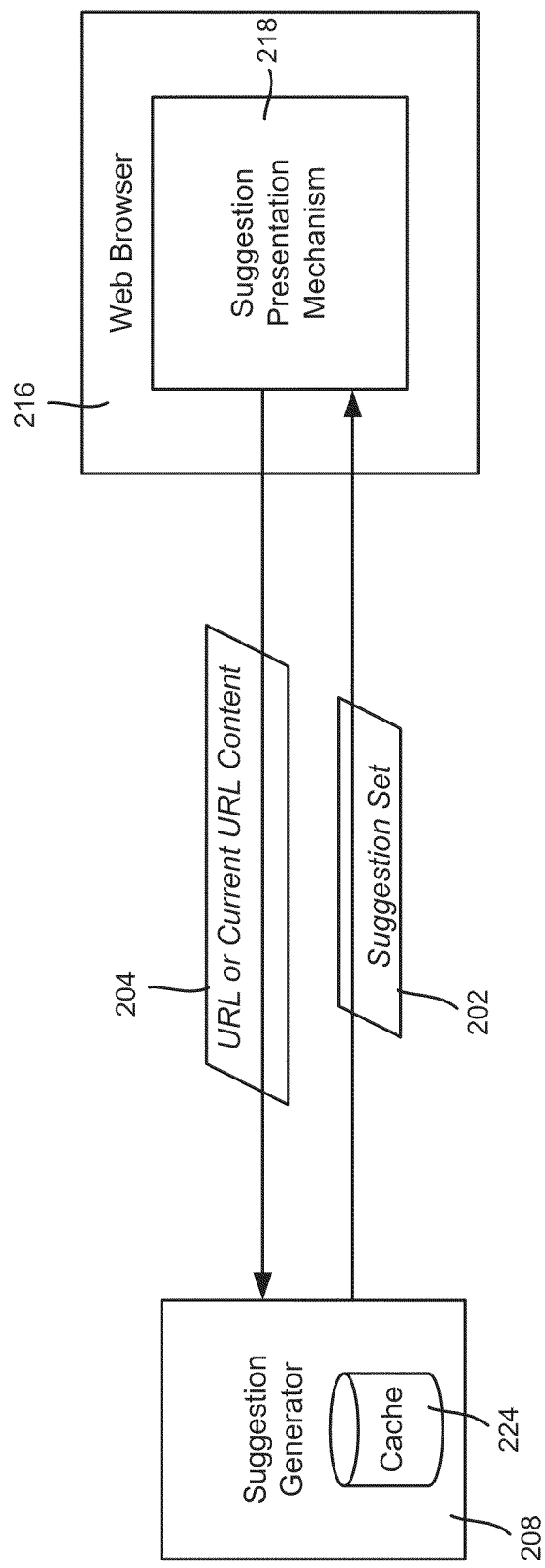
FIG. 2 is a block diagram representing an example implementation for providing suggested queries from a remote generator to a client-side web browser.

FIG. 2 shows one such an alternative implementation, in which a suggestion set 202 may be generated dynamically (or provided from a cache 224 if previously generated dynamically). For example, consider a web page such as a news story that is very recent. In such a situation, there may not be any log data (or only some insufficient amount) from which a per-URL suggestion set might otherwise be provided. Such a cache may be occasionally refreshed, such as periodically on a daily, weekly or monthly basis, for example.

By providing the URL and content of the URL 204 from a query-suggestion aware browser 216/suggestion presentation mechanism 218, a suggestion generator 208 can parse the content and provide the suggestion set 202 based upon the content. To this end, the textual content of the page can be parsed, with information retrieval/natural language processing techniques such as tf.idf weighting, named entity recognition, and summarization used to extract the salient elements of the page and offer them as page-based suggestions. In addition, queries can be derived from a page by using information extraction techniques, possibly with historical search browsing behavior used to decide on the most suitable suggestions. Note that known entity recognition technology may be used to identify named entities on the page and use them as a basis for suggestions. Once determined, the suggestion set for this URL may be associated with that URL in the cache 224 for subsequent use.

Figure 3:
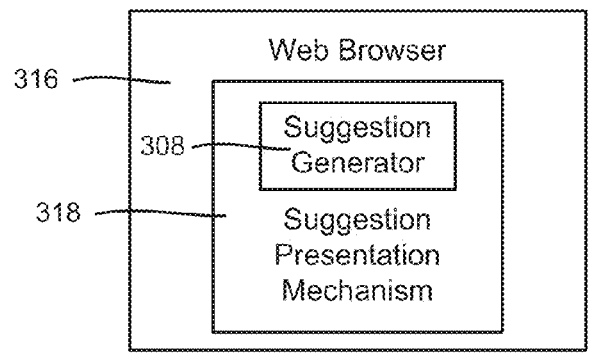
FIG. 3 is a block diagram representing an example implementation for generating suggested queries in a client-side web browser.

FIG. 3 is another alternative implementation, which is similar to the implementation of FIG. 2 except that the suggestion generator 208 is built into the client-side device, e.g., in the suggestion presentation mechanism 318 of the web browser 316. Again, a suggestion generator 308 can parse the content and provide a suggestion set based upon the content using known information retrieval/natural language processing techniques and entity recognition technology. Some historical information on the user's search and browsing behavior may be maintained on the client device and used in determining which suggestions to present.

Note that any and/or all of these example implementations may be combined. For example, if there is no suggestion set in a per-URL data store (as in FIG. 1), then a suggestion set may be dynamically generated (as in FIG. 2 and/or FIG. 3). As another example, a lightweight suggestion generator may be employed in the client (as in FIG. 3) so as to quickly provide a suggested query set while waiting for a data store's suggestion set (as in FIG. 1) and/or remote suggestion generation (as in FIG. 3, such as one that is more powerful) to provide another suggested query set or sets, which may be merged with the locally generated suggestion set when received.

Turning to aspects related to the generation and selection of suggested queries, interaction logs gathered from search engines, web browser toolbars, and web browsers are readily available to search engine companies, and yield valuable information for the selection of query suggestions. For example, such logs track queries and URL visits. Note that search logs are often used in the generation of search engine result page-based related searches.

There are a number of techniques that can generate suggested queries for URLs from such logs, including users' search engine behavior. Note that relevance (e.g., how pertinent, connected, or applicable the suggestions are to the user's information need) is one consideration when determining which query suggestions to provide. However, there may be situations where users may benefit from query suggestions that are diverse (e.g., when the user seeks topic coverage), recent (e.g., when the user is on a highly dynamic website), or marginally-related (e.g., to afford the user the opportunity to broaden the browsing experience). Novelty and monetization are other reasons to provide a query that is not necessarily the most relevant. Thus, when queries are assigned to URLs during the generation process, other factors such as these can be considered and alternative suggestion sets generated. Users may be given control of which criteria to use in determining the suggestions, or features of the page may be used to automatically determine the type of suggestions best suited to its content. Historical information (e.g., based upon a user's past behavior) may also be used.

One technique for generating suggested queries for URLs is directly based on various users' behavior during search engine interaction; if many users who visit a particular URL in the search engine later return to search with a particular query, (which may be subject to a time window and/or clicking on a result for that query), then that query is a candidate suggested query for that URL. If the query is the same query that was originally used to find the first URL, that query may be treated differently (e.g., discounted).

A variant of the above technique, which also retains the post-query URL (i.e., the clicked search result), allows queries that lead to the same result to be aggregated based on the result rather than the query text. This reduces duplicate URLs and increases the numbers of queries that can be reliably suggested for a given URL.

The general browsing behavior of users also may be considered. To this end, if users who browse to a particular URL eventually enter a particular query into a search engine, then the query entered can be suggested for the URL. Note that whether a subsequent query is considered related to the previous URL may be subject to a time window and/or other intervening user activities.

Another technique is available even for users who do not visit a search engine. If a user eventually goes to a particular URL (e.g., by using site search), especially if that URL is not linked directly, then there is a potential for a suggestion. Proximity within the log can be used to associate URLs for which suggested queries are available with URLs that are without suggested queries.

As another generation technique, consider a popular query that leads a significant fraction of the time to a particular URL, but also leads to other URLs; (e.g., one-third of the traffic goes to the current page, but the other two-thirds of the traffic goes to other pages). Such a query can be used as a suggestion for all pages, including the less definitive URLs.

Note that some of the above techniques are dependent on search logs, which limits suggestion generation to pages present in the log. Moreover, search engines typically index less than half of the content available on the web, which does not necessarily provide desired results using search engine logs alone. Thus, logs from browser toolbars and from browsers also may be used to obtain information on user browsing behavior that is useful for effective offline assignment of query suggestions to URLs.

Post-query browsing behavior provides a variant of the above "popular query" technique. This variant involves the use of multi-click trails of pages that are followed by users after queries are issued. Processing the logs allows the generator to backtrack along these trails to assign the origin query to all (or some) pages on the trail. Note that a discounted weight for URLs that are many clicks away from the query may be assigned, and/or a distance (and/or time) limit may be employed.

Queries and proximal web pages (e.g., those visited in the same browsing or search session) may be associated and used as suggestions for the pages. Alternatively, (or in addition), specialized crawls may be initiated to target pages for which no queries are able to be associated from log data, e.g., due to low visit counts.

As another technique, the content or structure of a website may also be used for suggested query generation. For example, queries for a particular page for which insufficient data exists can be generated by using those for the domain or for pages aggregated across the site, or a portion of the site that matches the URL structure or has similar content (e.g., based upon term distributions or the like).

As described above, the content of the page itself may be processed to extract suggested queries. These may be taken from the text itself, and/or the related search queries that would be returned if the user had typed in the text itself and submitted the text as a query.

As described, some of these above techniques utilize a time window between events to determine their association. This window may be chronological, and/or based on the number of events or other similar time/distance measures. In general, the larger the time window, the less that the suggested queries correlate with the page. The time window may be variable to suggest proximal queries when the user intent is clear and distal queries when it is unclear. Different time windows and/or distances may be used with different techniques.

Any or all of the above techniques may be combined, although as can be readily appreciated, the choice among these techniques may depend on the availability of data on a particular page (or site) in the logs. An active learning approach may be used to learn the value to users (e.g., in the form of suggestion click behavior or post-suggestion click engine interaction) of each technique in different situations.

In the generation techniques outlined above, suggestions are generated based on a single web page the user is currently browsing. However, suggested queries may also be based upon the recent interaction history of the user, particularly when suggested queries are implemented through client-side technology. For example, the previous five web sites a user has encountered may be tracked and used to improve the quality of suggestions for those pages with suggestions, and/or to provide a way to assign query suggestions to pages with none. Other sources of context such as the social context, e.g., queries issued by other users that visit a common page, and/or the collection context, e.g., queries issued to find pages that link to the current page, may also be used to generate higher quality suggestions or provide otherwise missing suggestions. In addition, personalization and geolocation information can be used to tailor query suggestions. For example, when no suggestions are available, suggestions based on the current user's general interests or interests of those located in the same city/state/country, and the like can be used to select potentially useful queries.

Moreover, once data is gathered on actual usage of suggested queries, the set of the suggested queries to provide may be refined. For example, the least-frequently (possibly below a threshold) clicked suggested query in a set may be replaced to see if a different suggested query is more popular to users of the corresponding URL. This may be regularly performed so that eventually the most used suggested queries will be part of the suggestion set.

Turning to the presentation of suggested queries to the users, once available, the suggested queries need to be shown during browsing activity, via some suitable alerting mechanism that is active on the user's machine. In order to not modify the content of web pages to embed suggestions into those pages, a client-side add-in to the web browser may be used to alert users about available suggestions. Note that alternatively, suggested query technology may be implemented in the browser code, or as another feature of the operating system (e.g., as a Windows® Vista sidebar gadget), or via other such delivery mechanisms.

In one implementation, query suggestions are accessed through a browser toolbar button that when selected provides a drop-down menu containing the suggestions, if available. Note that if no suggestions are available, the toolbar button may be blank, or may visually indicate that no suggestions are available, e.g., via text, or via coloring (or lack of color).

Figure 4:
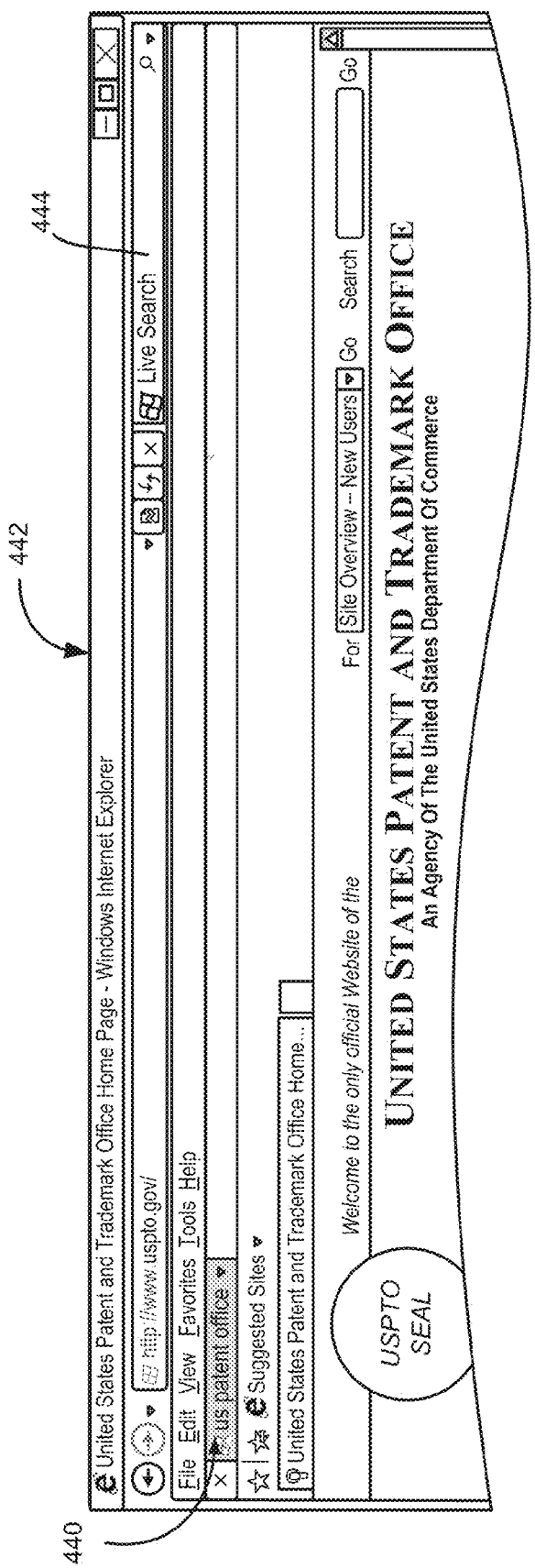
FIG. 4 is a representation of an example screenshot in which one or more suggested queries may be presented to a user via a toolbar button.

FIG. 4 shows a browser toolbar button 440 when a set of suggestions is available for an example page 442 (only part of the page is represented). Note that the button 440 may be highlighted or otherwise visually enhanced (e.g., flashing, differently colored-text, and so on) to as to indicate that one or more query suggestions exist for this page. Further, note that in this example, one query suggestion "us patent office" is shown on the button, such as based on ranking query suggestions relative to one another, e.g., most likely to be chosen.

Figure 5:
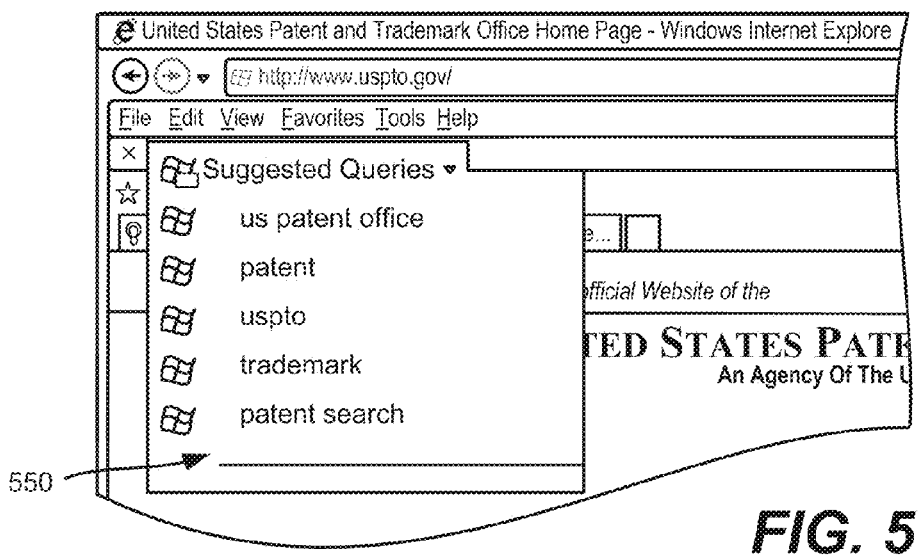
FIG. 5 is a representation of an example screenshot in which suggested queries are presented to a user in a dropdown menu.

FIG. 5 shows a drop down menu 550 that may appear when the toolbar button 440 of FIG. 4 is clicked or otherwise interacted with (e.g., hovered over for a sufficient time, although hovering may instead be used to provide a tooltip). On this menu 550, multiple query suggestions are presented for viewing and selection. Note that other information may be displayed on the drop down menu 550, such as suggested sites beneath the suggested queries.

While five per-URL query suggestions are shown in the example of FIG. 5, neither the number of suggestions nor the presentation style need be fixed. For example, query suggestions may be shown as an automatically-scrolling ticker. As another alternative, which query suggestions are currently being shown may depend on which part of a page the user is currently viewing. By way of example, consider a blog with multiple entries. The suggestion set may include subsets of query suggestions that are each appropriate for one of the blog entries. When the user is viewing or otherwise interacting with a blog entry, the subset of one or more query suggestions for that blog will be shown, and so on for each other blog entry.

Clicking on a query suggestion issues that query to a search engine, e.g., Bing™. The icon adjacent each suggestion may indicate the engine to which the query will be issued. The engine that is used can be fixed (e.g., in the case of an optional toolbar) or user-controlled (e.g., based on a currently-selected or preferred search provider). Additional information about the click action may be made available, e.g., on hover through a tooltip.

Figure 6:
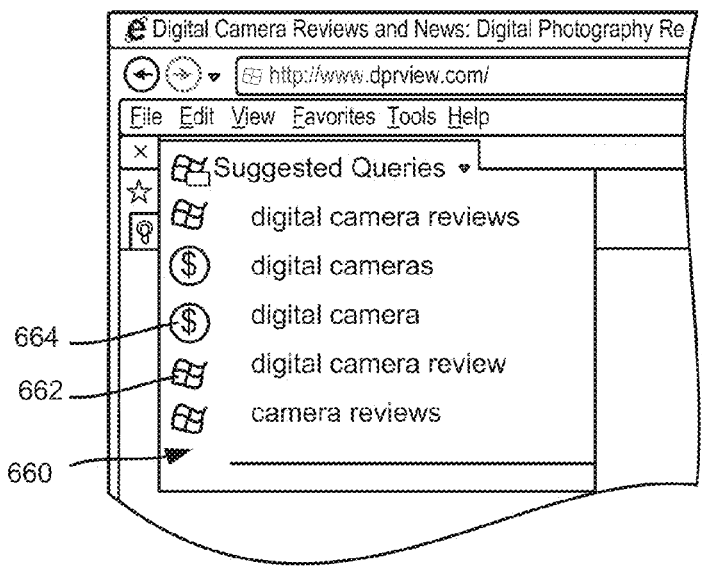
FIG. 6 is a representation of an example screenshot in which suggested queries are presented to a user in a dropdown menu, including with icons that provide additional information for the suggested queries.

Other information such as Bing™ Cashback offers may be communicated through the icons. An example of this is shown in FIG. 6 for a camera review site. In the dropdown menu 660, different icons 662 and 664 distinguish between the search engine that will be used if clicked and a cashback offer, respectively. Other icons or displayed content may be provided, e.g., a number indicative of suggestion popularity can be shown for each suggestion.

Note that where appropriate, queries can be suggested that lead users to specialized search engines (or search engine) verticals. For example, suggested queries may correspond to subject areas such as News or Images. The icon may be used to indicate this to a user.

Other types of interaction are feasible, such as to provide other options. For example, if a user right clicks on a suggested query, that interaction may present the user with choices as to how to search, (instead of having only one choice as indicated by an icon). For example, a general search engine may be the default selection if left-clicked, but if right clicked the user may be given a choice as to which search engine to use, e.g., general or specialized. In this way, for example, given the menu 550 of FIG. 5, a user can decide whether to submit a conventional search with the word "patent" or instead search for recent news events related to patents.

Still other interface options are possible. One example is to dynamically fill the search box 444 (FIG. 4) in the browser, or like search box in a toolbar, such as with the top-ranked query suggestion. Note that as the user begins to interact with the search box 444, additional query suggestions may be shown.

Further, the search results for each of the suggestions may be pre-fetched and displayed in some way. For example, the search results may be presented in a side-bar as part of the browser, or in a pop-up menu for each given query suggestion when that query suggestion is hovered over, or may be coordinated with a right-click.

As can be seen, suggested queries technology offers relevant search queries to users as they browse the web, including during general web browsing and/or post-query navigation, to help users find and formulate queries, find resources, and widen the scope of a search. Queries related to the active web page may be selected offline automatically, (e.g., for indexed pages or pages for which log data is available), or in real-time based on page content (e.g., for non-indexed, rarely-visited, or highly-dynamic pages). Suggested queries may be provided to users through client-side technology embedded in the web browser, operating system, or other delivery mechanisms.

Exemplary Operating Environment

Figure 7:
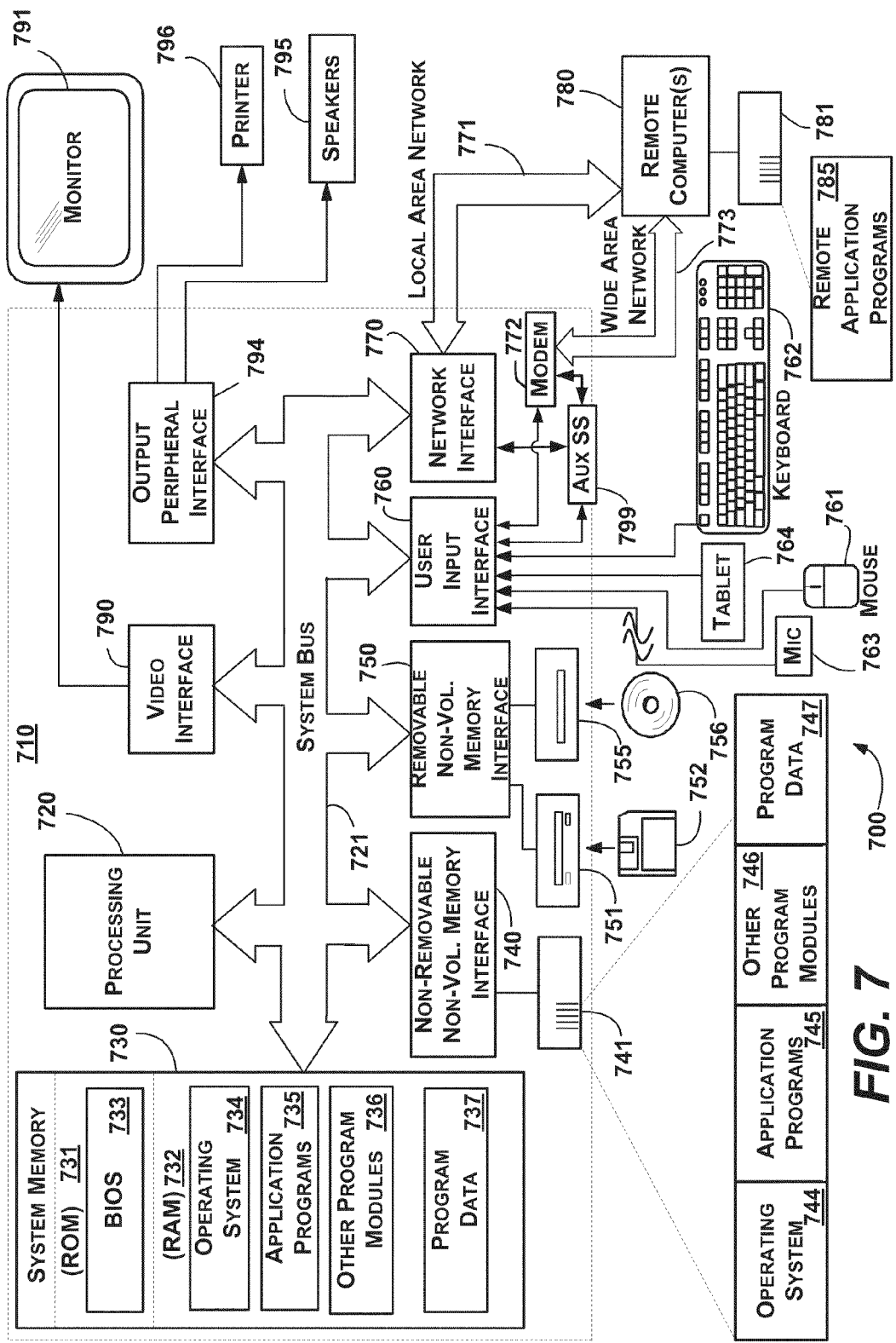
FIG. 7 shows an illustrative example of a computing environment into which various aspects of the present invention may be incorporated.

FIG. 7 illustrates an example of a suitable computing and networking environment 700 on which the examples of FIGS. 1-6 may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable a memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
displaying a web page that is not a search engine result page;
generating a suggested query set based upon an identity of the web page being displayed, or content of the web page being displayed, or both an identity of the web page being displayed and content of the web page being displayed, the suggested query set comprising one or more related search queries operative for selection in a search by a search engine; and
displaying the suggested query set on a display of a computing device having at least one processor including presenting the suggested query via a drop down menu on a browser component.

2. The method of claim 1 wherein displaying the suggested query set comprises executing client-side code.

3. The method of claim 1 further comprising, sending an identifier of the web page, or the content of the web page, or both the identifier and content, to a remote suggested query generator, and receiving the suggested query set in response.

4. The method of claim 1 further comprising, sending a uniform resource locator (URL) of the page to a remote source, and receiving the suggested query set in response.

5. The method of claim 4 further comprising, processing log data to generate the suggested query set, and maintaining data corresponding to the suggested query set in association with data corresponding to the URL in a data store.

6. The method of claim 1 further comprising, determining the suggested query set based at least in part on historical data corresponding to a user's prior interaction with a web browser.

7. The method of claim 1 wherein generating the suggested query set comprises generating one or more suggested queries based on proximity within a search-related log data of the web page.

8. The method of claim 1 wherein the browser component comprises a toolbar button.

9. The method of claim 1 wherein displaying the suggested query set comprises presenting a suggested query in conjunction with an icon that represents additional information with respect to that suggested query.

10. In a computing environment, a system comprising: a web browser configured to display web pages; and a suggestion presentation mechanism coupled to the web browser to display one or more suggested queries that are generated, via at least one processor, based upon content of a web page being displayed, including when the web browser is not displaying a search engine results page, the one or more suggested queries comprising one or more search queries associated with historical browsing behavior within a time window corresponding to the web page.

11. The system of claim 10 further comprising, a suggestion generator configured to generate the one or more suggested queries based on proximity within a search-related log data of the web page.

12. The system of claim 10 wherein the web browser sends a uniform resource locator (URL) to a remote source, or sends the content to a remote source, or sends both a URL and the content to a remote source, and receives the suggested queries in response.

13. The system of claim 10 further comprising, means for processing at least one search-related log to generate suggested queries for web pages.

14. The system of claim 10 further comprising means for processing the content of a web page to generate the one or more suggested queries for that web page.

15. The system of claim 10 wherein the suggestion presentation mechanism comprises a client-side add-in to the web browser.

16. In a computing environment, a system comprising at least one processor to execute a user interface module, the user interface module comprising, one part of the user interface module configured to display a web page, and an interactive part of the user interface module configured to generate one or more suggested search queries that are associated with the web page, including when the web page is not a search results web page, the other part being interactive to select a suggested search query when at least one suggested search query is available and to select another query based upon another web page within a same browsing session as the web page when no suggested search query is available, wherein the interactive part comprises a browser component that when interacted with displays one or more suggested search queries for selection.

17. The system of claim 16 wherein the browser component, when interacted with, provides a drop down menu that displays one or more suggested search queries for selection by further interaction.

18. The system of claim 17 wherein the browser component comprises a toolbar button.

19. The system of claim 16 wherein the drop down menu includes an icon associated with text of a suggested search query, the icon communicating information regarding that search query in addition to the text.

20. The system of claim 16 wherein the interactive part corresponds to a search box that is populated with at least one suggested search query when at least one suggested search query is available for the web page.

* * * * *